United States Patent
Hwang

(10) Patent No.: US 11,884,253 B2
(45) Date of Patent: Jan. 30, 2024

(54) VEHICLE BRAKE SYSTEM

(71) Applicant: HYUNDAI MOBIS CO., LTD., Seoul (KR)

(72) Inventor: Woo Hyun Hwang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 289 days.

(21) Appl. No.: 17/316,868

(22) Filed: May 11, 2021

(65) Prior Publication Data
US 2021/0370895 A1    Dec. 2, 2021

(30) Foreign Application Priority Data
May 29, 2020    (KR) .......................... 10-2020-0064803

(51) Int. Cl.
*G01M 17/00* (2006.01)
*B60T 8/171* (2006.01)
*B60T 8/88* (2006.01)

(52) U.S. Cl.
CPC .............. *B60T 8/171* (2013.01); *B60T 8/885* (2013.01); *B60T 2270/416* (2013.01); *B60Y 2400/3032* (2013.01)

(58) Field of Classification Search
CPC .... B60T 8/171; B60T 8/885; B60T 2270/416; B60T 8/172; B60T 17/221; B60T 8/176; B60T 8/329; B60Y 2400/3032; B60Y 2306/15; B60Y 2400/90; G06F 7/00; G01M 17/00
USPC ........................................................ 701/29.7
See application file for complete search history.

(56) References Cited

U.S. PATENT DOCUMENTS

| | | | | |
|---|---|---|---|---|
| 5,984,429 A | * | 11/1999 | Nell ....................... | B60T 8/4854 303/155 |
| 2016/0325719 A1 | * | 11/2016 | Linhoff ................. | B60T 8/4872 |
| 2020/0070795 A1 | * | 3/2020 | Van Thiel ............... | B60T 13/74 |
| 2020/0216052 A1 | * | 7/2020 | Campau ................ | B60T 13/745 |
| 2021/0339723 A1 | * | 11/2021 | Funai ....................... | B60T 1/10 |

\* cited by examiner

*Primary Examiner* — Shardul D Patel
(74) *Attorney, Agent, or Firm* — NovoTechIP International PLLC

(57) ABSTRACT

A vehicle brake system is disclosed for dynamic braking of a vehicle based on wheel speeds, including a first wheel speed sensor, a second wheel speed sensor, a main controller for calculating a first wheel speed of each wheel by a signal received from the first wheel speed sensor to generate a first wheel speed signal and to perform dynamic braking control based on the first wheel speed signal, an auxiliary controller for calculating a second wheel speed of each wheel by a signal received from the second wheel speed sensor to generate a second wheel speed signal, and digital signal transfer lines for transceiving a normal signal or abnormality signal between the main and auxiliary controllers.

13 Claims, 2 Drawing Sheets

VEHICLE BRAKE SYSTEM

CROSS-REFERENCE TO RELATED APPLICATIONS

This application is based on, and claims priority from, Korean Patent Application Number 10-2020-0064803, filed May 29, 2020, the disclosure of which is incorporated by reference herein in its entirety.

TECHNICAL FIELD

The present disclosure in some embodiments relates to a vehicle brake system and method for operating thereof. More specifically, the present disclosure relates to a vehicle brake system for dynamic braking control of a vehicle based on wheel speeds and a method of calculating vehicle wheel speed.

BACKGROUND

The statements in this section merely provide background information related to the present disclosure and do not necessarily constitute prior art.

An electronic control unit (ECU) mounted on a vehicle appropriately controls a driving force of the respective wheels to prevent the vehicle in acceleration, deceleration, or cornering maneuver from spinning out by a low-friction road surface. There are various methods of controlling the driving force, such as distributing a braking force by using a braking hydraulic pressure or controlling engine torque.

A control method for preventing the spin-out phenomenon typically includes a dynamic braking control method such as an anti-lock braking system (ABS) and electronic stability control (ESC) which need to be implemented by measuring the respective wheel speeds in real-time. However, a malfunction in any one of the wheel speed sensors disposed on the respective wheels obstructs the normal dynamic braking control operation while the vehicle is running.

Conventionally, to overcome this issue, a first wheel speed sensor and a second wheel speed sensor have been independently arranged for each wheel to secure redundancy in calculating the wheel speeds. A vehicle has been installed with the main controller and an auxiliary controller arranged separately and designed so that the main controller calculates the wheel speeds based on the first wheel speed sensors and the auxiliary controller calculates the wheel speeds based on the second wheel speed sensors. The main controller and the auxiliary controller are arranged to use a communications unit for transmitting and receiving information on whether a malfunction has occurred in the first wheel speed sensors and the second wheel speed sensors. However, the communications unit generally has a signal transmission cycle of about 10 ms and takes time of up to approximately 20 ms for detecting and responding to a malfunction in any one of the first wheel speed sensors and the second wheel speed sensors. When implementing dynamic braking control, a blank time as long as 20 ms can be fatal to the vehicle occupants' safety.

SUMMARY

According to at least one embodiment, the present disclosure provides a vehicle brake system for dynamic braking of a vehicle based on one or more wheel speeds, including a first wheel speed sensor and a second wheel speed sensor disposed on each of wheels and configured in combination to calculate the wheel speed of each wheel, the main controller, an auxiliary controller, and a plurality of digital signal transfer lines. The main controller is configured to calculate the first wheel speed of each of the wheels in the vehicle by using a signal that is received from the first wheel speed sensor to generate a first wheel speed signal and to perform dynamic braking control based on the first wheel speed signal. The auxiliary controller is configured to calculate a second wheel speed of each wheel by using a signal that is received from the second wheel speed sensor to generate a second wheel speed signal. The plurality of digital signal transfer lines is configured to transmit and receive a normal signal or an abnormality signal between the main controller and the auxiliary controller. Here, the main controller determines whether a difference between the first wheel speed signal and the second wheel speed signal is within a predetermined tolerance range, and if yes, transmits the normal signal, and otherwise, transmits the abnormality signal to the auxiliary controller.

According to another embodiment, the present disclosure provides a method of braking a vehicle which has wheels each equipped with a first wheel speed sensor and a second wheel speed sensor, by performing dynamic braking control on the vehicle based on wheel speeds, the method including measuring a first wheel speed and a second wheel speed based on a signal from the first wheel speed sensor and based on a signal from the second wheel speed sensor, respectively, and determining whether a difference between the first wheel speed and the second wheel speed is within a predetermined tolerance range, and performing a digital signal transmission including (1) transmitting a normal signal by using digital signal transfer lines upon determining that the first wheel speed and the second wheel speed differ in magnitude by less than the preset tolerance and (2) transmitting an abnormality signal by using the digital signal transfer lines upon determining that the first wheel speed and the second wheel speed differ in magnitude by greater than or equal to the preset tolerance, and performing an inspection by at least one or more of a main controller and an auxiliary controller for a presence or absence of a malfunction of at least one or more of the first wheel speed sensor and the second wheel speed sensor, according to signals of the digital signal transfer lines, and calculating wheel speeds of the wheels based on any one of the first wheel speed and the second wheel speed according to an outcome of the performing of the inspection.

DETAILED DESCRIPTION

Figure 1:
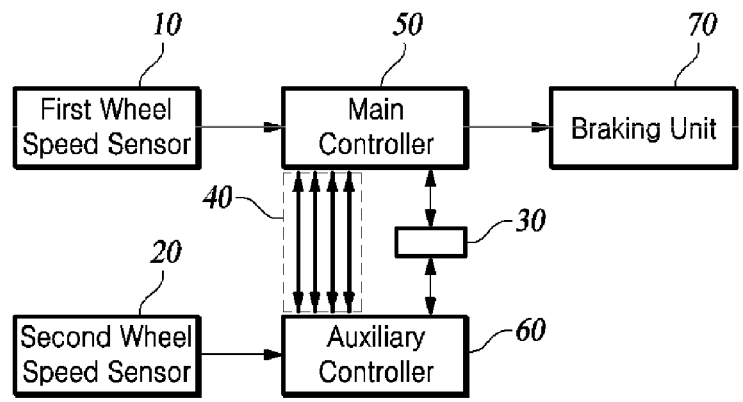
FIG. 1 is a block diagram of a vehicle brake system according to at least one embodiment of the present disclosure.

The present disclosure in at least one embodiment seeks to shorten the time required to detect and respond when a malfunction occurs in any one of the first wheel speed sensors and the second wheel speed sensors disposed on the respective vehicle wheels.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a block diagram of a vehicle brake system according to at least one embodiment of the present disclosure.

As shown in FIG. 1, a vehicle brake system includes all or some of a first wheel speed sensor 10, a second wheel speed sensor 20, a main controller 50, an auxiliary controller 60, a signal transfer line 40, a communications unit 30, and a braking unit 70.

The first wheel speed sensor 10 and the second wheel speed sensor 20 are disposed on each of the vehicle wheels and used to calculate the wheel speed of each wheel. The first wheel speed sensor 10 transmits a wheel speed-related signal to the main controller 50. The second wheel speed sensor transmits a wheel speed detection signal to the auxiliary controller 60.

The communications unit 30 is arranged to transmit and receive information between the main controller 50 and the auxiliary controller 60. For example, the main controller 50 and the auxiliary controller 60 may use the communications unit 30 for transmitting and receiving each other information on whether or not there is a malfunction of the wheel speed sensors, wheel speed values, and other data. The communications unit 30 may use, but not limited to, a controller area network (CAN) communication method. The communications unit 30 may be used to transmit and receive signals between the main controller 50 and the auxiliary controller 60 as well as between components requiring communications within the vehicle. In general, the signal transmission cycle of the communications unit 30 is about 10 ms.

The signal transfer line 40 may be a digital signal transfer line. The digital signal transfer line 40 is arranged between the main controller 50 and the auxiliary controller 60 to transmit and receive a normal signal or an abnormality signal there between. The main controller 50 and the auxiliary controller 60 may transmit and receive these two types of digital signals via the digital signal transfer line 40. Here, the normal signal may be called 'High' and the abnormality signal may be low'. The two digital signals may also be referred to by terms such as On/Off and True/False other than High/Low, and they are not limited to the literal terms.

Unlike the communications unit 30, the digital signal transfer line 40 takes less than 1 ms to transmit the digital signals. The digital signal transfer line 40 may transmit two kinds of digital signals according to the magnitude of the voltage. For example, the main controller 50 or the auxiliary controller 60 may apply the digital signal transfer line 40 with a voltage of about 5 V (voltage) for indicating High and a voltage of about 0 V for indicating Low.

As shown in FIG. 1, multiples of the digital signal transfer line 40 may be arranged, and they may be provided as many as the number of wheels arranged in the vehicle. In particular, for use with a vehicle, four digital signal transfer lines 40 are preferably arranged for transmitting and receiving normal signals or abnormality signals from the result of comparing between the magnitudes of the first wheel speed signals and the second wheel speed signals of the respective wheels.

The main controller 50 utilizes the signal received from the first wheel speed sensor 10 for calculating the first wheel speed of each of the vehicle-installed wheels to generate first wheel speed signals and utilizes the first wheel speed signals as a basis for performing the dynamic braking control. Here, the first wheel speed signal signifies the magnitude of the first wheel speed, and the magnitude of the first wheel speed signal is proportional to that of the first wheel speed. Here, the dynamic braking control is a control for preventing the vehicle from spinning due to the wheel spinning when the vehicle accelerates or brakes while driving. Functions that utilize dynamic braking control include anti-lock brake system (ABS), traction control system (TCS), electronic stability program (ESP), and electronic stability control (ESC) among others.

Here, the ABS is a function of controlling the distribution of braking pressure over the respective wheels to prevent the wheels from being locked when the vehicle is braked or decelerated on a low-friction road surface.

Here, the TCS is a function of controlling the driving force to the wheels by using the braking unit 70 to prevent the wheels from idling due to excessive driving force generated during vehicle acceleration on a low-friction road surface. TCS includes functions such as anti-spin regulator (ASR) and vehicle dynamic control (VDC). ASR and VDC are also functions to prevent slip by using a braking force on the wheels when the vehicle accelerates on a low-friction road surface or when taking a corner.

Here, ESP is an integration of ABS and TCS functions for preventing the vehicle from sliding from side to side.

Here, the ESC is a function that prevents the spin phenomenon of the vehicle by controlling the ABS function as well as the engine torque.

Dynamic braking control is not limited to the functions or terms as described above and includes all functions of controlling the attitude of the vehicle by applying a braking force to the wheels for preventing the vehicle from spinning in its driving situation.

Unless there is an abnormality in the first wheel speed sensor 10 and the second wheel speed sensor 20, the main controller 50 computes the speed of the respective wheels and the driving speed of the vehicle based on the first wheel speed signal. The main controller 50 compares information on the second wheel speed sensor 20 received from the auxiliary controller 60, that is, the second wheel speed signal with the first wheel speed signal. The main controller 50 determines whether a difference between the first wheel speed signal and the second wheel speed signal is within a predetermined tolerance range. Upon determining that the difference between the first wheel speed signal and the second wheel speed signal is not within the predetermined tolerance range, the main controller 50 may determine that a malfunction occurs in one or more of the first wheel speed sensor or the second wheel speed sensor. Accordingly, when the main controller 50 determines that the differences between the first wheel speed signal and the second wheel speed signal is not within the predetermined tolerance range, it transmits the normal signal to the auxiliary controller 60 by using the digital signal transfer line 40. Otherwise, the main controller 50 transmits an abnormality signal to the auxiliary controller 60 by using the digital signal transfer line 40.

The auxiliary controller 60 generates a second wheel speed signal by calculating a second wheel speed of each wheel with a signal received from the second wheel speed sensor 20. Here, the second wheel speed signal signifies the magnitude of the second wheel speed, and the magnitude of the second wheel speed signal is proportional to that of the second wheel speed.

When the main controller 50 loses the driving function or the braking function of the vehicle, the auxiliary controller 60 may take the place of those functions. The main controller 50 and the auxiliary controller 60 may be physically disposed adjacent to each other or may be separated and disposed at separate locations inside the vehicle.

The braking unit 70 is arranged to receive a braking signal from the main controller 50 or the auxiliary controller 60 and distribute the braking force to the respective vehicle wheels.

Figure 2:
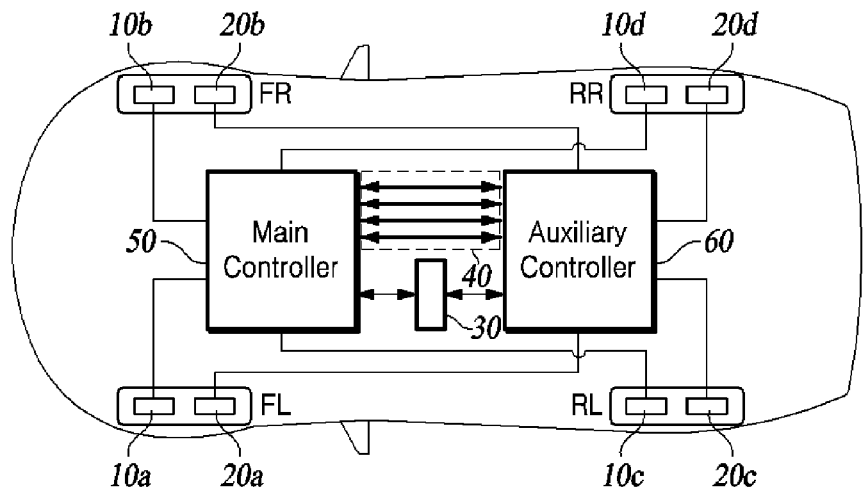
FIG. 2 is a schematic diagram of a vehicle brake system according to at least one embodiment of the present disclosure.

FIG. 2 is a schematic diagram of a vehicle brake system according to at least one embodiment of the present disclosure.

As shown in FIG. 2, two wheel-speed sensors are disposed on each of the four wheels FL, FR, RL, and RR. In particular, each wheel is provided with one first wheel speed sensor and a single second-wheel speed sensor. Here, FL stands for Front-Left, meaning the front left wheel. FR stands for Front-Right, the right front wheel. RL stands for Rear-Left, the left rear wheel. RR stands for Rear-Right, the right rear wheel. The embodiment of FIG. 2 is an example for schematically describing a vehicle brake system, which is not restrictive of the arrangements and configurations of the vehicle brake system of the present disclosure as illustrated.

Four first wheel speed sensors 10*a*, 10*b*, 10*c*, 10*d* of the wheel speed sensors disposed on the four wheels FL, FR, RL, RR transmit wheel speed detection signals of the respective wheels to the main controller 50. Four second-wheel speed sensors 20*a*, 20*b*, 20*c*, 20*d* of the wheel speed sensors disposed on the four wheels FL, FR, RL, RR transmit wheel speed detection signals of the respective wheels to the auxiliary controller 60.

The main controller 50 measures the respective wheel speeds based on the four first wheel speed sensors 10*a* to 10*d* when all wheel-speed sensors are normal. When a malfunction occurs in any one of the four first wheel speed sensors 10*a* to 10*d*, the relevant wheel utilizes any one of the four second-wheel speed sensors 20*a*, 20*b*, 20*c*, 20*d* to perform wheel speed measurement. For example, when a malfunction occurs in the first wheel speed sensor 10*a* disposed in FL, the main controller 50 measures the wheel speed of the FL upon receiving, from the auxiliary controller 60, the wheel speed measured by the auxiliary controller 60 based on the second wheel speed sensor 20*a* disposed in FL, which is transmitted by using the communications unit 30. The remaining wheel speeds of FR, RL, and RR are continuously measured by using the first wheel speed sensors 10*b* to 10*d*.

According to the illustrated disclosure in FIG. 2, four digital signal transfer lines 40 are arranged, each corresponding to one of wheels FL, FR, RL, and RR. When the plurality of digital signal transfer lines 40 is set so that any one of them transmits an abnormality signal, the main controller 50 determines the presence or absence of a malfunction of the first wheel speed sensor 10 disposed on the single wheel relevant (hereinafter called 'first wheel') to the digital signal transfer line 40 that transmits the abnormality signal. The auxiliary controller 60 also determines the presence or absence of a malfunction of the second wheel speed sensor that is disposed on the first wheel from the time the abnormality signal is received.

According to the determined presence or absence of the malfunction of the first wheel speed sensor and the second wheel speed sensor, the wheel speed is calculated by three different calculation methods. First, when the main controller 50 determines that a malfunction occurs in the first wheel speed sensor 10 disposed on the first wheel, it determines the wheel speed of the first wheel based on the second wheel speed signal. Second, when the auxiliary controller 60 determines that a malfunction occurs in the second wheel speed sensor 20 disposed on the first wheel, the main controller 50 determines the wheel speed of the first wheel based on the first wheel speed signal. Finally, when the main controller 50 and the auxiliary controller 60 determine that a malfunction occurs in the first wheel speed sensor and the second wheel speed sensor both disposed on the first wheel, the main controller 50 warns the vehicle driver of the malfunction, and at the same time, ends the operation of the dynamic braking control.

Even when the digital signal transfer line 40 is set to transmit a normal signal, to ensure the stability of the vehicle, the main controller 50 autonomously determines the presence or absence of a malfunction of the first wheel speed sensor 10 disposed on each of the wheels. Here, when the main controller 50 determines that a malfunction occurs in the first wheel speed sensor disposed on one of the wheels, it calculates the wheel speed of the second wheel based on the second wheel speed signal.

Figure 3:
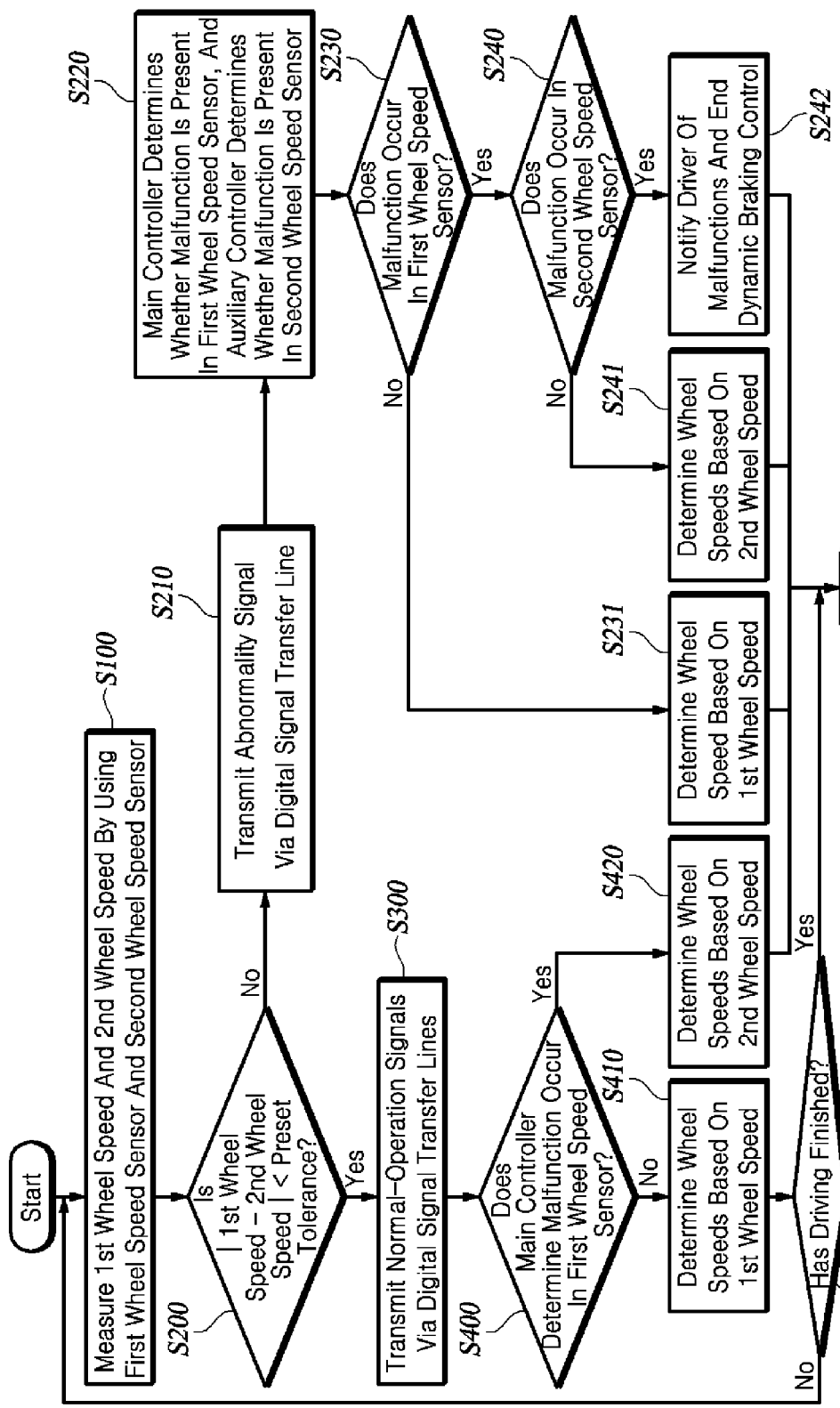
FIG. 3 is a flowchart of a method of calculating vehicle wheel speeds according to at least one embodiment of the present disclosure.

FIG. 3 is a flowchart of a method of calculating vehicle wheel speeds according to at least one embodiment of the present disclosure.

When the vehicle is running, the first wheel speed and the second wheel speed are calculated by using the first wheel speed sensor 10 and the second wheel speed sensor 20 (S100). Here, the wheel speed detection signals of the first wheel speed sensor 10 and the second wheel speed sensor 20 are transmitted to separate controllers, respectively. For example, the wheel speed detection signal of the first wheel speed sensor 10 is transmitted to the main controller 50, and the wheel speed detection signal of the second wheel speed sensor 20 is transmitted to the auxiliary controller 60. The information on the wheel speed calculated by each controller may be communicated by the main controller 50 and the auxiliary controller 60 to each other by using the communications unit 30.

The main controller 50 determines whether the absolute value of the difference between the first wheel speed and the second wheel speed is within a predetermined tolerance range (S200). When the main controller 50 determines that the absolute value of the difference is within the predetermined tolerance range, it transmits a normal-operation signal to the auxiliary controller 60 via the digital signal transfer line 40 (S300). When the absolute value of the difference is not within the predetermined tolerance range, the main controller 50 transmits an abnormality signal to the auxiliary controller 60 via the digital signal transfer line 40 (S210).

After Step S300, the main controller 50 determines whether a malfunction occurs in the first wheel speed sensor 10 (S400). Upon determining that no malfunction occurs in the first wheel speed sensor 10, the main controller 50 determines the wheel speed based on the first wheel speed (S410). Upon determining that a malfunction occurs in the first wheel speed sensor 10, the main controller 50 determines the wheel speed based on the second wheel speed (S420). Step S420 may be further provided for informing the driver that a malfunction occurs in the first wheel speed sensor of the relevant wheel. After the process S420, the algorithm of FIG. 3 is terminated.

After Step S410, it is determined whether the vehicle has finished driving (S500). Upon determining that the vehicle has finished driving, the algorithm of FIG. 3 is terminated, but when it is determined that the vehicle has not finished driving, the process returns to Step S100.

After Step S210, the main controller 50 determines whether a malfunction occurs in the first wheel speed sensor 10, and the auxiliary controller 60 also determines, since it received the abnormality signal, whether a malfunction occurs in the second wheel speed sensor 20 (S220).

Upon determining whether there is a malfunction, a determination is made first on whether a malfunction occurs in the first wheel speed sensor 10 (S230). When the main controller 50 determines that no malfunction occurs in the first wheel speed sensor 10, it determines the wheel speed based on the first wheel speed (S231). After Step S231, the algorithm of FIG. 3 is terminated.

When the main controller 50 determines that a malfunction occurs in the first wheel speed sensor 10, it determines whether or not a malfunction occurs in the second wheel speed sensor 20 (S240). Upon determining that no malfunction occurs in the second wheel speed sensor 20, the main controller 50 determines the wheel speed based on the second wheel speed (S241). Conversely, upon determining that a malfunction occurs in the second wheel speed sensor 20, the main controller 50 notifies the vehicle driver of the malfunction and ends the dynamic braking control function (S242). After Steps S241 and S242, the algorithm of FIG. 3 is terminated.

As described above, according to some embodiments of the present disclosure, the vehicle brake system has at least one or more digital signal transfer lines arranged between the main controller and the auxiliary controller for providing an extremely fast transmission of a signal indicating that an abnormality occurs, resulting in a reduced time to detect and respond to the occurrence of a malfunction.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A vehicle brake system comprising:
   a first wheel speed sensor configured to detect a speed of a wheel and generate a first signal indicating the speed of the wheel detected by the first wheel speed sensor;
   a second wheel speed sensor configured to detect the speed of the wheel and generate a second signal indicating the speed of the wheel detected by the second wheel speed sensor;
   a main controller configured to generate, based on the first signal generated by the first wheel speed sensor, a first wheel speed signal, and control braking of the wheel based on the first wheel speed signal; and
   an auxiliary controller configured to generate, based on the second signal generated by the second wheel speed sensor, a second wheel speed signal,
   wherein the main controller is further configured to:
   determine whether a difference between the first and second wheel speed signals is within a predetermined tolerance range;
   in response to determining that the difference between the first and second wheel speed signals is within a predetermined tolerance range, transmitting, to the auxiliary controller, a normal signal; and
   in response to determining that the difference between the first and second wheel speed signals is not within the predetermined tolerance range, transmitting, to the auxiliary controller, an abnormal signal.

2. The vehicle brake system of claim 1, wherein:
   the wheel comprises a plurality of wheels, each wheel provided with the first and second wheel speed sensors, and
   the vehicle brake system further comprises a plurality of signal transfer lines provided corresponding to the plurality of wheels, respectively, each signal transfer line configured to transmit, between the main controller and auxiliary controller, the normal or abnormal signal related to the first and second wheel speed sensors of a corresponding wheel.

3. The vehicle brake system of claim 1, wherein:
   the main controller is further configured to determine whether the first wheel speed sensor is malfunctioning when the difference between the first and second wheel speed signals is not within the predetermined tolerance range, and
   the auxiliary controller is further configured to determine whether the second wheel speed sensor is malfunctioning when the abnormal signal is received from the main controller.

4. The vehicle brake system of claim 3, wherein the main controller is further configured to:
   determine whether the first wheel speed sensor is malfunctioning; and
   in response to determining that the first wheel speed sensor is malfunctioning, calculate the speed of the wheel based on the second wheel speed signal generated by the auxiliary controller.

5. The vehicle brake system of claim 3, wherein the main controller is further configured to:
   determine whether the second wheel speed sensor is malfunctioning; and
   in response to determining that the second wheel speed sensor is malfunctioning, calculate the speed of the wheel based on the first wheel speed signal.

6. The vehicle brake system of claim 3, wherein the main controller is further configured to:
   determine whether both first and second wheel speed sensors are malfunctioning; and
   in response to determining that both the first and second wheel speed sensors are malfunctioning, performing:
   generating, for a driver of the vehicle, a warning indicating the malfunctioning of the first and second wheel speed sensors; and
   stopping controlling braking of the wheel based on the first wheel speed signal.

7. The vehicle brake system of claim 1, wherein:
   the wheel comprises a plurality of wheels, each wheel provided with the first and second wheel speed sensors,
   the vehicle brake system further comprises a plurality of signal transfer lines provided corresponding to the plurality of wheels, respectively, each signal transfer line configured to transmit, between the main controller and auxiliary controller, a normal or abnormal signal related to the first and second wheel speed sensors of the corresponding wheel, and the main controller is further configured to determine whether the first wheel speed sensors provided to the plurality of wheels are malfunctioning when all of the plurality of signal transfer lines are set to transit the normal signal.

8. The vehicle brake system of claim 7, wherein:

the plurality of wheels comprises a first wheel, and the main controller is further configured to calculate a speed of a first wheel based on the second wheel speed signal when the main controller determines that the malfunction occurs in the first wheel speed sensor provided for the first wheel.

9. The vehicle brake system of claim 1, further comprising a communications unit configured to transmit, between the main controller and the auxiliary controller, information on a presence or absence of the malfunctioning of the first and second wheel speed sensors, and information on the first and second wheel speed signals.

10. A method of operating a system for controlling braking of a wheel, the method comprising:

providing, to a main controller, a first signal indicating a speed of a wheel detected by a first wheel speed sensor, the main controller configured to determine a first wheel speed based on the first signal and control braking of the wheel based on the determined first wheel speed;

providing, to an auxiliary controller, a second signal indicating the speed of the wheel detected by a second wheel speed sensor, the auxiliary controller configured to determine a second wheel speed based on the second signal;

determining whether a difference between the first and second wheel speeds is within a predetermined tolerance range;

in response to determining that the difference between the first and second wheel speeds is not within the predetermined tolerance range, determining whether the first or second wheel speed sensor is malfunctioning; and in response to determining that the first wheel speed sensor is malfunctioning, providing the second signal to the main controller such that the main controller determines the first wheel speed based on the second signal.

11. The method of claim 10, further comprising, in response to determining that the first wheel speed sensor is not malfunctioning, transmitting, from the main controller to the auxiliary controller, a normal signal.

12. The method of claim 10, further comprising, in response to determining that the first wheel speed sensor is malfunctioning, transmitting, from the main controller to the auxiliary controller, an abnormal signal.

13. The method of claim 12, further comprising, in response to determining that the first or second wheel speed sensor is malfunctioning, preforming:

notifying a driver of the vehicle of the malfunctioning of the first or second wheel speed sensor; and stopping controlling braking of the wheel based on the first or second signal.

* * * * *